United States Patent
Calvert

(10) Patent No.: US 6,747,915 B2
(45) Date of Patent: Jun. 8, 2004

(54) SEISMIC IMAGING A SUBSURFACE FORMATION

(75) Inventor: Rodney William Calvert, Rijswijk (NL)

(73) Assignee: Shell Oil Company, Houston, TX (US)

( * ) Notice: Subject to any disclaimer, the term of this patent is extended or adjusted under 35 U.S.C. 154(b) by 49 days.

(21) Appl. No.: 10/234,918

(22) Filed: Sep. 4, 2002

(65) Prior Publication Data

US 2003/0076740 A1 Apr. 24, 2003

(30) Foreign Application Priority Data

Sep. 7, 2001 (EP) .......................... 01307634.4

(51) Int. Cl.[7] .............. G01K 1/34; G01V 1/42; G01V 1/02
(52) U.S. Cl. .............. 367/46; 367/25; 367/27; 367/50; 702/14; 702/17
(58) Field of Search .............. 367/25, 27, 46, 367/50; 702/14, 17

(56) References Cited

U.S. PATENT DOCUMENTS

| | | |
|---|---|---|
| 5,067,113 A | 11/1991 | Hanson et al. |
| 5,235,857 A * | 8/1993 | Anderson .............. 73/625 |
| 5,481,501 A | 1/1996 | Blakeslee et al. |
| 5,596,548 A | 1/1997 | Krebs |
| 6,125,330 A | 9/2000 | Robertson et al. |

FOREIGN PATENT DOCUMENTS

| | | |
|---|---|---|
| EP | 443234 | 8/1991 |
| EP | 0 924 161 A2 | 6/1999 |
| EP | 0 924 162 A2 | 6/1999 |
| EP | 0 924 163 A2 | 6/1999 |
| WO | WO 99 65097 A1 | 12/1999 |
| WO | WO 02/075363 A1 * | 9/2002 |
| WO | WO 03/023449 A1 * | 3/2003 |
| WO | WO 03/023450 A1 * | 3/2003 |

* cited by examiner

Primary Examiner—Nelson Moskowitz

(57) ABSTRACT

A method of seismic imaging a subsurface formation using an array of seismic sources and an array of seismic receivers located subsurface, wherein there is a complex transmission medium between the two sets by creating a virtual source at a selected receiver within the array, time-reversing a portion of the signal related to the selected source and receiver and convolving the time-reversed portion of the signal with the signal at adjoining receivers within the array and repeating the process for signals attributable to various surface sources to create a seismic image of a target formation.

7 Claims, 1 Drawing Sheet

SEISMIC IMAGING A SUBSURFACE FORMATION

BACKGROUND OF THE INVENTION

The present invention relates to a method of seismic imaging a subsurface formation using a set of seismic sources i and a set of seismic receivers j, wherein there is a complex transmission medium between the two sets. Such a complex transmission medium is for example a complex overburden.

A seismic image of an earth formation is obtained using at least one seismic source and at least one seismic receiver. The source generates a seismic wave into the earth formation, in which formation the seismic wave is reflected by acoustic-impedance contrasts and refracted through media having a variable velocity. The reflected wave is received by the seismic receiver(s). A receiver detects the reflected wave and records it in the form of a signal or seismic trace. The receivers record one signal per receiver and the signals or traces are compiled to yield the seismic image of the underground formation.

Normally, seismic images are obtained with seismic sources and seismic receivers that are located at surface, however, there is a tendency to put the seismic receivers and/or the seismic sources in boreholes, even in horizontal boreholes. However, seismic sources intended for borehole use are typically more expensive than comparable surface seismic sources. Moreover, seismic sources located in a wellbore have the potential to damage the wellbore when activated.

An alternative is to locate the seismic sources at the surface and place the seismic receivers in a borehole. This has the advantage that the receivers can be placed closer to the region of the formation of which an image has to be obtained. This permits the application of a migration algorithm that uses a velocity model of the earth and propagates wave fronts through it. This technique is common and is described in Gray, S. H., et al., *Kirchoff Migration Using Eikonal Traveltimes*, Geophysics vol. 59, pp. 810–817, Soc. Of Expl. Geophys. 1994. However, this advantage is cancelled if there is a complex transmission medium between the sources and the receivers that distorts the signals. Such a complex transmission medium region is for example a complex overburden.

SUMMARY OF THE INVENTION

It will be understood that one way of overcoming this disadvantage is to put the seismic sources in the same borehole. Applicant has now found that it is possible to manipulate the signals in such a way that it appears as if the seismic waves originate from a source at the location of the seismic receiver. Such a source is then called a virtual source, to distinguish it from a real source, which is in this case located at the other side of the complex transmission medium.

To this end the method of seismic imaging a subsurface formation using a set of seismic sources i and a set of seismic receivers j, wherein there is a complex transmission medium between the two sets, which method comprises the steps of (a) recording with the set of seismic receivers j the signals $t_{ij}(t)$ obtained from activating the set of seismic sources i;

(b) selecting a seismic receiver m as the location of a virtual source;

(c) selecting a seismic receiver k, wherein k is in a predetermined range around the position of seismic receiver m;

(d) selecting a seismic source n from the seismic sources i;

(e) time-reversing at least a part of the signal $t_{nm}(t)$ to obtain a time-reversed signal $t_{nm}(-t)$;

(f) convolving the time-reversed signal $t_{nm}(-t)$ with the signal $t_{nk}(t)$ to obtain the convolved signal $t^{conv}_{nmnk}(t) = t_{nm}(-t) \otimes t_{nk}(t)$;

(g) selecting a next source n, repeating steps (e) and (f) until a predetermined number of sources have had their turn;

(h) summing the convolved signals over the seismic sources n to obtain a signal $$t^{vs}_{mk}(t) = \sum_n t^{conv}_{nmnk},$$

where $t^{vs}_{mk}(t)$ is the signal received by a receiver at the position k from a virtual source at the position of receiver m;

(i) repeating steps (c) through (g) over k;

(j) repeating steps (b)–(h) over m to generate a seismic survey with virtual sources m and receivers k; and (k) further processing the virtual source signals to obtain a seismic image.

In the specification and in the claims the symbol $\otimes$ means convolution.

BRIEF DESCRIPTION OF THE DRAWINGS

The invention will now be discussed by way of example in more detail with reference to FIG. 1 showing schematically and not to scale an arrangement of seismic sources and seismic receivers for carrying out the method of the present invention.

DETAILED DESCRIPTION OF THE PREFERRED EMBODIMENT

Figure 1:
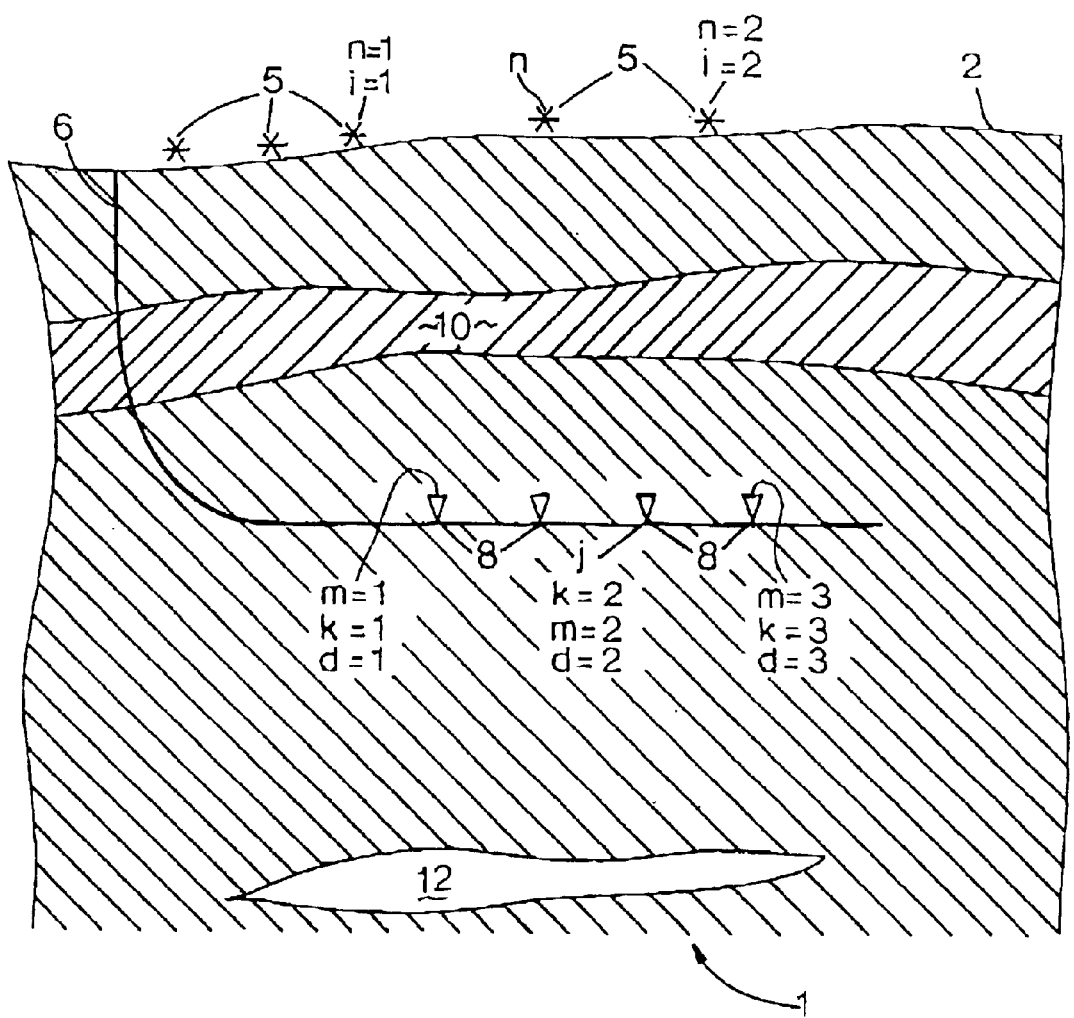

FIG. 1 shows schematically and not to scale a section 1 of the earth having a surface 2. At the surface 2 are located seismic sources 5, and in a borehole 6 are located seismic receivers 8. The part of the borehole 6 in which the seismic receivers 8 are located lies under a complex transmission medium in the form of complex overburden 10. Deeper in the section 1 of the earth, below the complex overburden 10, a target area 12 is located of which a seismic image is to be made.

The first step of the method according to the present invention is conventional: recording with a set of the seismic receivers 8 the signals obtained from activating a set of the seismic sources 5. It will be understood that the seismic wave that is emitted by a seismic source 5 and received by a seismic receiver 8 generates a signal varying with time, which signal consists of a part that comes from the seismic wave that passes through the complex overburden 10 towards the receiver 8 and a part that comes from waves that travel all the way down to the target area 12 and that are reflected back to the seismic receiver 8. The first part of the signal is called the direct part of the signal. The latter part of the signal contains the valuable target information. It is an object of the present invention to suppress the distortions in the signal caused by the seismic waves travelling through the complex overburden 10.

In the formulae that will be used to explain the invention, the signals can be referred using the symbol $t_{5i,8j}(t)$, wherein $5i$ refers to a seismic source 5 and $8j$ to a seismic receiver 8; however, for the sake of clarity we will remove the '5' and the '8' from the symbol. Thus the signals are identified as $t_{ij}(t)$, wherein i refers to a seismic source and j to a seismic receiver.

In order to suppress the distortions, Applicant proposes to put a virtual source at the position of a seismic receiver 8, and to treat the signals $t_{ij}(t)$ such that a signal is obtained that originates from waves travelling from the virtual source positioned at receiver 8.

Thus the next step of the method according to the present invention is selecting a seismic receiver 8m as the location of a virtual source.

Then a seismic source 5n is selected from the seismic sources 5i. From the signals $t_{ij}(t)$ the signal $t_{nm}(t)$ is selected and at least a part of the signal $t_{nm}(t)$ is time-reversed to obtain time-reversed signal $t_{nm}(-t)$ Time reversal is just trace reflection about time zero, thus a trace from time 0 to time t becomes from time 0 to time $-t$. The portion of the signal that is time-reversed may be selected based on the specific geology. For instance, a time window function may be used to select first arrivals or may be increasingly extended to include additional reverberations. Further, the selection of signal process may be performed iteratively by successive approximations to the targeted formation. An example of the part of the signal that is time-reversed is the signal due to the direct wave, which is that part of the signal that is received with receiver 8m that comes from the seismic wave directly travelling from the source 5n towards the receiver 8m through the complex overburden 10. Further, the signal $t_{ij}(t)$ may be pre-processed so as to differentiate between waves being propagated toward the target formation (down-going) and those returning toward the surface from the target (up-going).

The virtual source is assumed to be at the position of the seismic receiver 8m, and it is an object to obtain from the signals from the sources 5n a signal that originates from the virtual source m and is received at a receiver 8k.

Having selected the seismic receiver 8k, wherein k is in a predetermined range around the position of seismic receiver 8m, the time-reversed signal $t_{nm}(-t)$ is convolved with the signal $t_{nk}(t)$ to obtain the convolved signal $t^{conv}_{nmnk}(t)=t_{nm}(-t)\otimes t_{nk}(t)$.

In order to get the convolved signals for the seismic sources n, a next source n is selected, and the above steps, which result in the convolved signal, are repeated. Then the convolved signals are summed over the seismic sources n to obtain a signal $$t^{vs}_{mk}(t) = \sum_n t^{conv}_{nmnk}.$$

The signal $t^{vs}_{mk}(t)$ is the signal received by a receiver at the position k from a virtual source at the position of receiver m. This signal is free from distortions that originate from the direct wave travelling through the complex overburden 10.

In order to obtain a seismic image the above steps are repeated over k to get the signals $t^{vs}_{mk}(t)$ received at a set of seismic receivers 8k from the virtual seismic source 8m, and then the steps are repeated over m to obtain the complete seismic image.

The above-described steps will be illustrated by way of example with reference to the following example.

Select seismic sources 5i, wherein i=1 and i=2, and select seismic receivers 8j, wherein j=1, j=2 and j=3. The signals are $t_{11}(t)$, $t_{12}(t)$, $t_{13}(t)$, $t_{21}(t)$, $t_{22}(t)$ and $t_{23}(t)$. Of the seismic receivers 8 we select the one at position j=2 to become the virtual source, thus m=2, which we will refer to as the virtual source at the 2-position.

The first seismic receiver that we select is the one at the position j=1, thus k=1. The first seismic source that we select is the one at the position i=1, thus n=1, which we will refer to as a source at the 1-position. The part of the seismic signal $t_{12}(t)$ that is time-reversed is the direct part $t^d_{12}(t)$, and the time-reversed signal is thus $t^d_{12}(-t)$. The time-reversed signal, $t^d_{12}(-t)$, is now convolved with the signal $t_{11}(t)$ (from the source at the n=1-position to the receiver at the k=1-position), or $t^{conv}_{1211}(t)=t^d_{12}(-t)\otimes t_{11}(t)$.

Then we select the second seismic source, at the position i=2, thus n=2, which we will refer to as a source at the n=2-position. Because m=2, the time-reversed direct signal is obtained by time reversing the direct part of $t^d_{22}(t)$, which gives $t^d_{22}(-t)$. The time-reversed signal, $t^d_{22}(-t)$, is now convolved with the signal $t_{21}(t)$ (from the source at the n=2-position to the receiver at the k=1-position), or $t^{conv}_{2221}(t)=t^d_{22}(-t)\otimes t_{21}(t)$.

The signal obtained at a receiver at the k=1 position from a virtual source at the m=2 position is $$t^{vs}_{21}(t) = \sum_{n=1,2} t^{conv}_{n2n1}.$$

To obtain a seismic image the steps are first repeated over k. For the seismic receiver at position k=2, with the seismic sources at positions n=1 and n=2 and with the virtual source at position m=2, this gives the following. The time-reversed signals are $t^d_{12}(-t)$ and $t^d_{22}(-t)$, the signals are $t_{12}(t)$ and $t_{22}(t)$, and the convolved signals are $t^{conv}_{1212}(t)=t^d_{12}(-t)\otimes t_{12}(t)$ and $t^{conv}_{2222}(t)=t^d_{22}(-t)\otimes t_{22}(t)$ The signal obtain at a receiver at the k=2 position from a virtual source at the m=2 position $$t^{vs}_{22}(t) = \sum_{n=1,2} t^{conv}_{n2n2}.$$

For the seismic receiver at position k=3, with the seismic sources at positions n=1 and n=2 and with the virtual source at position m=2, this gives the following. The time-reversed signals are $t^d_{12}(-t)$ and $t^d_{22}(-t)$, the signals are $t_{13}(t)$ and $t_{23}(t)$, and the convolved signals are $t^{conv}_{1213}(t)=t^d_{12}(-t)\otimes t_{13}(t)$ and $t^{conv}_{2223}(t)=t^d_{23}(-t)\otimes t_{22}(t)$. The signal obtain at a receiver at the k=3 position from a virtual source at the m=2 position is $$t^{vs}_{23}(t) = \sum_{n=1,2} t^{conv}_{n2n3}.$$

The above steps are then repeated over m to generate a seismic survey with virtual sources m=1,2,3 and receivers k=1,2,3. The results are summarized in the below Table.

Table. Signals that make the image obtained by the method according to the present invention.

TABLE

Signals that make the image obtained by the method according to the present invention.

| | | Seismic receiver at position | | |
|---|---|---|---|---|
| | | k = 1 | k = 2 | k = 3 |
| Virtual source at position | m = 1 | $t^{vs}_{11}(t) = \sum_{n=1,2} t^{conv}_{n1n1}$ | $t^{vs}_{12}(t) = \sum_{n=1,2} t^{conv}_{n1n2}$ | $t^{vs}_{13}(t) = \sum_{n=1,2} t^{conv}_{n1n3}$ |
| | m = 2 | $t^{vs}_{21}(t) = \sum_{n=1,2} t^{conv}_{n2n1}$ | $t^{vs}_{22}(t) = \sum_{n=1,2} t^{conv}_{n2n2}$ | $t^{vs}_{23}(t) = \sum_{n=1,2} t^{conv}_{n2n3}$ |
| | m = 3 | $t^{vs}_{31}(t) = \sum_{n=1,2} t^{conv}_{n3n1}$ | $t^{vs}_{32}(t) = \sum_{n=1,2} t^{conv}_{n3n2}$ | $T^{vs}_{33}(t) = \sum_{n=1,2} t^{conv}_{n3n3}$ |

The part of the signal $t_{nm}(t)$ that is time-reversed can be the direct part, which is in this case the down-going part. However, the part of the signal can be extended to include reverberations, multiples and other scattered arrivals from the complex overburden, to this end a certain time interval is selected. In other words the time-reversed signal is gated by selecting a time-window around the first arrivals.

Suitably, the time-reversed signal $t_{nm}(-t)$ is weighted to control the radiation pattern of the virtual source.

Suitably the recorded signals $t_{ij}(t)$ are pre-processed to separate the contributions from up- and down-going waves.

Suitably processing the time reversed signal $t_{nm}(-t)$ further includes spectral phase and amplitude adjusting the time-reversed signal to provide desired wavelet shaping.

In the above we described a spatial configuration in which the complex transmission medium was a complex overburden, which was present between the two sets. However, the method of the present invention can be applied in other spatial configurations of subsurface formation, complex transmission medium, seismic sources and seismic receivers. For example the seismic sources i can be arranged in a borehole with a complex transmission medium between them and the seismic receivers j.

Thus the invention may suitably be used to generate virtual sources at receiver locations in many different configurations.

What is claimed is:

1. A method of seismic imaging a subsurface formation using a set of seismic sources i and a set of seismic receivers j, wherein there is a complex transmission medium between the two sets, which method comprises the steps of
    (a) recording with the set of seismic receivers j the signals tij(t) obtained from activating the set of seismic sources i;
    (b) selecting a seismic receiver m as the location of a virtual source;
    (c) selecting a seismic receiver k, wherein k is in a predetermined range around the position of seismic receiver m;
    (d) selecting a seismic source n from the seismic sources i;
    (e) time-reversing at least a part of the signal $t_{nm}(t)$ to obtain a time-reversed signal $t_{nm}(-t)$;
    (f) convolving the time-reversed signal $t_{nm}(-t)$ with the signal $t_{nk}(t)$ to obtain the convolved signal $t^{conv}_{nmnk}(t) = t_{nm}(-t) \otimes t_{nk}(t)$;
    (g) selecting a next source n, repeating steps (e) and
    (f) until a predetermined number of sources have had their turn;
    (h) summing the convolved signals over the seismic sources n to obtain a signal $$t^{vs}_{mk}(t) = \sum_n t^{conv}_{nmnk},$$

Where $t^{vs}_{mk}(t)$ is the signal received by a receiver at the position k from a virtual source at the position of receiver m;
    (i) repeating steps (c) through (g) over k;
    (j) repeating steps (b)–(h) over m to generate a seismic survey with virtual sources m and receivers k; and
    (k) further processing the virtual source signals to obtain a seismic image.

2. The method according to claim 1, wherein the time-reversed signal $t_{nm}(-t)$ is gated before it is convolved in step (f).

3. The method according to claim 1, wherein the time-reversed signal $t_{nm}(-t)$ is weighted before it is convolved in step (f).

4. The method according to claim 1, wherein the recorded signals $t_{ij}(t)$ are pre-processed to separate the contributions from up- and down-going waves.

5. The method according to claim 2, wherein the time-reversed signal $t_{nm}(-t)$ is weighted before it is convolved in step (f).

6. The method according to claims 2, wherein the recorded signals $t_{ij}(t)$ are pre-processed to separate the contributions from up- and down-going waves.

7. The method according to claim 3, wherein the recorded signals $t_{ij}(t)$ are pre-processed to separate the contributions from up- and down-going waves.

* * * * *